(12) United States Patent
Shirasuna et al.

(10) Patent No.: US 11,420,709 B2
(45) Date of Patent: Aug. 23, 2022

(54) STRADDLE TYPE ELECTRIC VEHICLE

(71) Applicant: HONDA MOTOR CO., LTD., Tokyo (JP)

(72) Inventors: Takamori Shirasuna, Wako (JP); Makoto Fujikubo, Wako (JP); Kazuya Atsumi, Wako (JP); Yoshihiro Nomura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 172 days.

(21) Appl. No.: 17/026,865

(22) Filed: Sep. 21, 2020

(65) Prior Publication Data
US 2021/0001953 A1    Jan. 7, 2021

Related U.S. Application Data

(63) Continuation of application No. PCT/JP2018/013425, filed on Mar. 29, 2018.

(51) Int. Cl.
| | | |
|---|---|---|
| B62J 41/00 | (2020.01) | |
| B62J 43/16 | (2020.01) | |
| B62J 45/00 | (2020.01) | |
| B62K 11/04 | (2006.01) | |
| B62M 7/02 | (2006.01) | |

(52) U.S. Cl.
CPC ............... B62M 7/02 (2013.01); B62J 41/00 (2020.02); B62J 43/16 (2020.02); B62J 45/00 (2020.02); *B62K 11/04* (2013.01); *B62K 2204/00* (2013.01)

(58) Field of Classification Search
CPC .................................. B62J 41/00; B62J 43/16
USPC .......................................................... 180/220
See application file for complete search history.

(56) References Cited

U.S. PATENT DOCUMENTS

| | | | |
|---|---|---|---|
| 6,836,037 B1 | 12/2004 | Tsuboi | |
| 8,485,300 B2 | 7/2013 | Hasegawa et al. | |
| 8,783,405 B2 | 7/2014 | Irie et al. | |
| 8,899,369 B2 * | 12/2014 | Matsuda | B62K 11/00 180/220 |
| 9,160,214 B2 | 10/2015 | Matsuda | |
| 9,308,966 B2 * | 4/2016 | Kosuge | H01M 50/20 |
| 9,415,694 B2 | 8/2016 | Matsuda | |

(Continued)

FOREIGN PATENT DOCUMENTS

| | | |
|---|---|---|
| CN | 102869563 A | 1/2013 |
| EP | 0755854 A1 | 1/1997 |

(Continued)

OTHER PUBLICATIONS

Indian Office Action for Indian Patent Application No. 202047044454 dated Apr. 1, 2021.

(Continued)

*Primary Examiner* — Minnah L Seoh
*Assistant Examiner* — Hosam Shabara
(74) *Attorney, Agent, or Firm* — Thomas | Horstemeyer, LLP

(57) ABSTRACT

A straddle type electric vehicle comprises a vehicle body frame, a motor unit including an electric motor, a battery that supplies power to the motor unit, and a control unit that executes drive control of the motor unit. The vehicle body frame includes a main frame extending in a vehicle longitudinal direction. The motor unit, the battery, and the control unit are supported by the main frame between the front wheel and the rear wheel, and in a vehicle side view. The motor unit and the control unit are disposed overlapping one another.

9 Claims, 6 Drawing Sheets

(56) References Cited

U.S. PATENT DOCUMENTS

| | | | |
|---|---|---|---|
| 10,011,324 B2* | 7/2018 | Inoue | B60K 1/04 |
| 2006/0038522 A1* | 2/2006 | Iwashita | B60L 50/66 |
| | | | 318/592 |
| 2012/0111651 A1 | 5/2012 | Irie et al. | |
| 2012/0193155 A1 | 8/2012 | Hasegawa et al. | |
| 2013/0234505 A1 | 9/2013 | Matsuda | |
| 2013/0270938 A1 | 10/2013 | Matsuda | |
| 2015/0232150 A1 | 8/2015 | Kosuge et al. | |
| 2022/0032764 A1* | 2/2022 | Kaneko | B62J 41/00 |

FOREIGN PATENT DOCUMENTS

| | | |
|---|---|---|
| EP | 2353980 A1 | 8/2011 |
| JP | H04-358986 A | 12/1992 |
| JP | 2001163287 A | 6/2001 |
| JP | 2012101679 A | 5/2012 |
| JP | 2012158292 A | 8/2012 |
| WO | 2011/098492 A1 | 8/2011 |
| WO | 2012059962 A1 | 5/2012 |
| WO | 2012063291 A1 | 5/2012 |
| WO | 2019186950 A1 | 10/2019 |

OTHER PUBLICATIONS

Chinese Office Action for Chinese Patent Application No. 201880091406.1 dated May 6, 2021.
International Search Report for PCT/JP2018/013425 dated Jul. 3, 2018.
IPRP for PCT/JP2018/013425 dated Feb. 5, 2020.

* cited by examiner

US 11,420,709 B2

STRADDLE TYPE ELECTRIC VEHICLE

CROSS-REFERENCE TO RELATED APPLICATION

This application is a continuation of International Patent Application No. PCT/JP2018/0134125 filed on Mar. 29, 2018, the entire disclosures of which is incorporated herein by reference.

BACKGROUND OF THE INVENTION

Field of the Invention

The present invention relates to a straddle type electric vehicle.

Description of the Related Art

A known straddle type electric vehicle using an electric motor as the drive power source includes a straddle type electric vehicle installed with a battery that supplies power to an electric motor and control unit that controls the power supplied from the battery to the electric motor (for example. International Publication No. 2012/063291).

SUMMARY OF THE INVENTION

In a straddle type electric vehicle in which power is supplied from a battery to an electric motor, cruising distance depends on the capacity of the battery. Thus, ensuring space for housing a larger battery is desirable.

An embodiment of the present invention provides a straddle type electric vehicle in which more housing space for a battery can be ensured.

According to an embodiment of the present invention, a straddle type electric vehicle comprises:
a front wheel and a rear wheel;
a vehicle body frame that supports a steering mechanism for steeling the front wheel;
a motor unit including an electric motor that outputs a driving force to rotate the rear wheel;
a battery that supplies power to the motor unit; and
a control unit that executes drive control of the motor unit, wherein
the vehicle body frame includes a main frame extending in a vehicle longitudinal direction;
the motor unit, the battery, and the control unit are supported by the main frame between the front wheel and the rear wheel;
in a vehicle side view; the motor unit and the control are disposed overlapping one another; and
the motor unit and the control unit are disposed in a vehicle width direction so that traveling winds pass between the motor unit and the control unit.

Further features of the present invention will become apparent from the following description of exemplary embodiments (with reference to the attached drawings).

DESCRIPTION OF THE EMBODIMENTS

Figure 1:
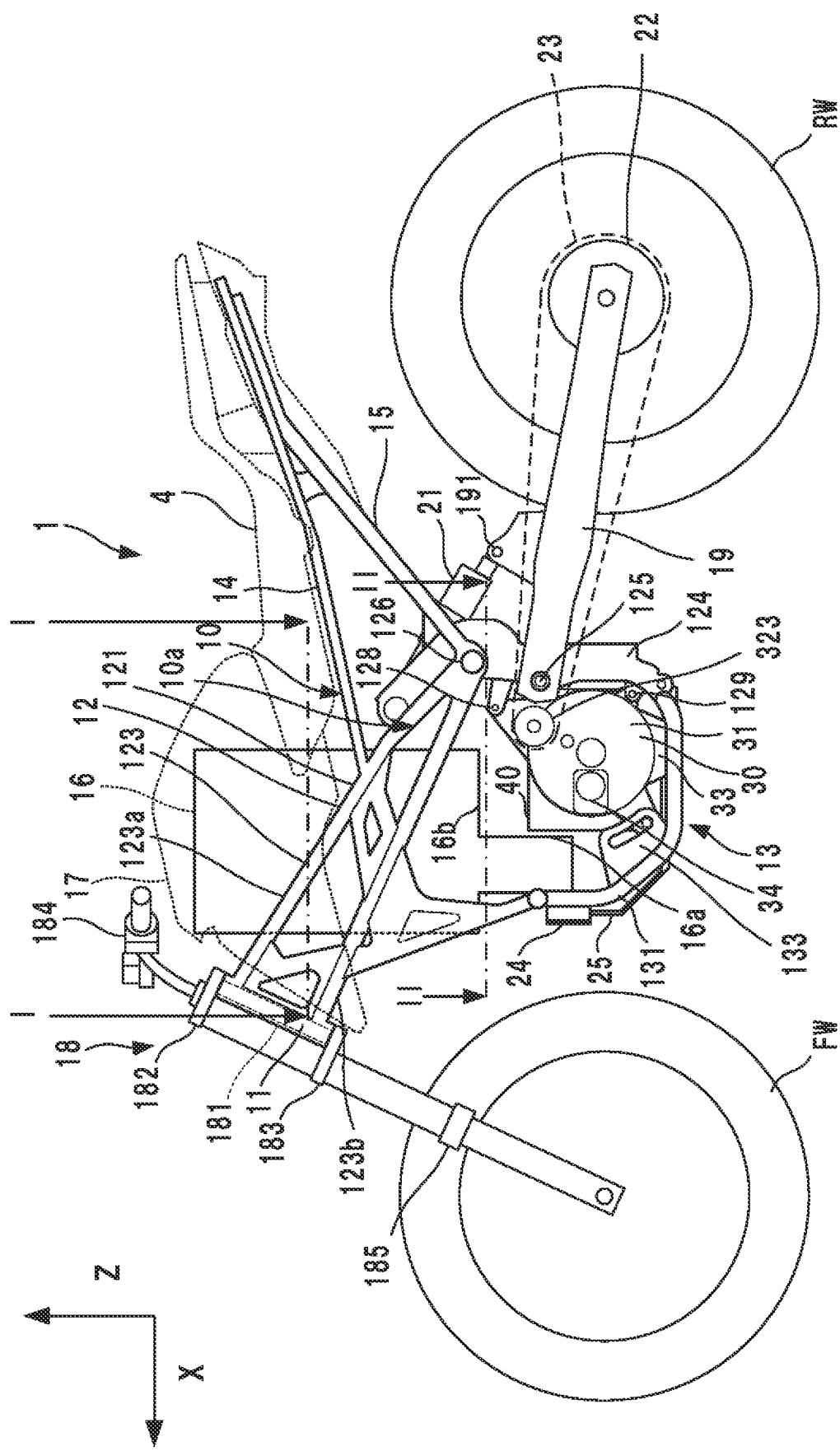
FIG. 1 is a left side view of a straddle type electric vehicle according to a first embodiment.

A straddle type vehicle according to an embodiment of the present invention will be described with reference to the drawings. In the drawings, arrows X, Y, and Z indicate directions orthogonal to one another, with the X direction indicating the front-and-rear direction of the straddle type vehicle, the Y direction indicating the vehicle width direction (lateral direction) of the straddle type vehicle, and the Z direction indicating the vertical direction. Hereinafter, the front and rear of the front-and-rear direction of the straddle type vehicle may be simply referred to as "front" and "rear", and the inner side and outer side in the vehicle width direction (lateral direction) of the straddle type vehicle may be simply referred to as "inner side" and "outer side". Also, when describing a left and right pair of components, one of the left and right pair may be not illustrated or the description thereof may be omitted.

First Embodiment

Summary of the Straddle Type Vehicle

FIG. 1 is a left side view of a straddle type electric vehicle 1 according to an embodiment of the present invention. The same drawing is a schematic view with a main portion of the straddle type electric vehicle 1 centered. Hereinafter, the straddle type electric vehicle 1 may be referred to as the vehicle 1.

The vehicle 1 is provided with a vehicle body frame 10 that includes a head pipe 11 provided in a vehicle front portion; a main frame 12 connected to the head pipe 11 and extending in the front-and-rear direction; a down frame 13 extending in the front-and-rear direction downward from the main frame 12, and a seat frame 14 extending rearward from the main frame 12. Also, the main frames 12 are connected at rear end portions thereof and the down frames 13 are connected at rear end portions thereof.

Figure 2:
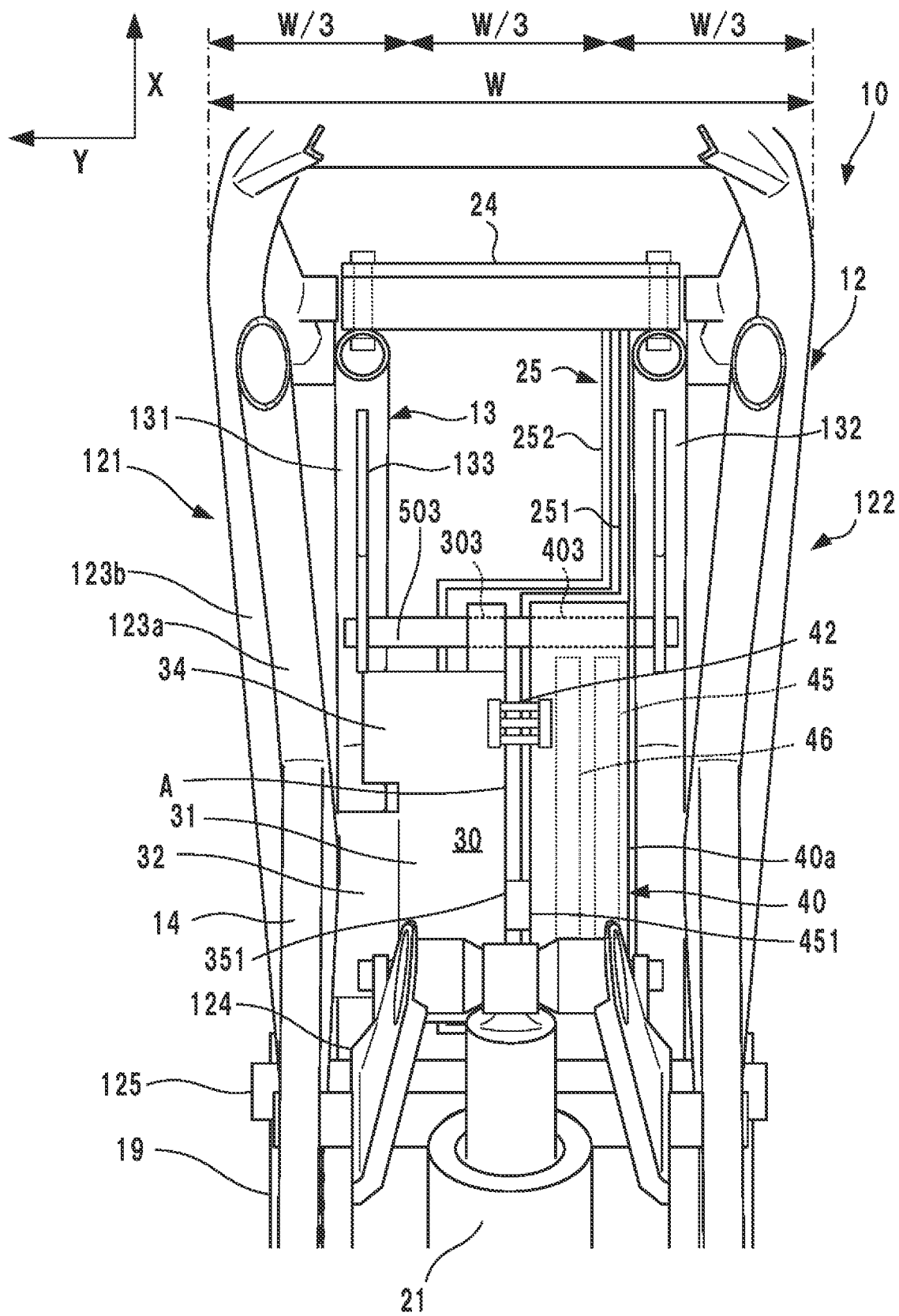
FIG. 2 is a cross-sectional view taken along line I-I of FIG. 1 with some components omitted.

Next, FIG. 2 as well as FIG. 1 will be referenced. FIG. 2 is a cross-sectional view taken along line I-I of FIG. 1 with some components removed. The main frame 12 of the present embodiment includes a left frame portion 121 extending on the left side of the vehicle 1 from the head pipe 11 and a right frame portion 122 extending on the right side of the vehicle 1 from the head pipe 11. The frame portions are formed separated in the vehicle width direction (on the left and right). The left frame portion 121 and the right frame portion 122 each include a front frame portion 123 and a rear frame portion 124.

The front frame portion 123 of the present embodiment includes an upper portion 123a extending from an upper portion of the head pipe 11 rearwardly downward with respect to the vehicle and a lower portion 123b extending from a lower portion of the head pipe 11 rearwardly downward with respect to the vehicle. The upper portion 123a and the lower portion 123b are connected at a rear end portion 126 of the front frame portion 123 or connected at a midway portion. With this configuration, weight reduction can be achieved and the rigidity of the main frame 12 can be increased.

Note that in the present embodiment, the main frame 12 is divided to the left and right from the head pipe 11 and extends rearwardly downward with respect to the vehicle, forming the left frame portion 121 and the right frame portion 122 along the entire region of the main frame 12. However, other configurations may be employed, including configurations in which a single frame portion extends rearward from the head pipe 11 and branches into the left frame portion 121 and the right frame portion 122 and configurations in which the frame portion does not branch. Also, the front frame portion 123 in the present embodiment includes the upper portion 123a extending rearward from an upper portion of the head pipe 11 and the lower portion 123b extending rearward from a lower portion, both divided to the left and right. However, a configuration may be employed in which a single portion on the left and right extends rearward from the head pipe 11.

The left and right rear frame portions 124 are formed extending vertically from the rear end portions 126 of the front frame portions 123, and upper portions of the left and right rear frame portions 124 support a rear suspension 21. Also, the rear frame portions 124 include a pivot shaft 125 that supports a rear swing arm 19, described below, downward from the rear end portions 126 of the front frame portion 123. Furthermore, the rear frame portion 124 at the lower end is connected to the rear end of the down frame 13. Note that the front frame portion 123 and the rear frame portion 124 may be integrally formed or may be separate members joined via metallurgical bonding such as welding, mechanical joining such as bolt fastening, or the like.

The down frame 13 is provided extending in the vehicle longitudinal direction downward from the main frame 12. The down frame 13 extends from a lower portion of the main frame downward to a lower end, extends from the lower end rearward, and connects to a lower end of the rear frame portion 124. Also, the down frame 13 includes a left down frame portion 131 and a right down frame portion 132.

In the present embodiment, the down frame 13 extends downward from a lower portion of the main frame 12. However, a configuration may be employed in which the down frame 13 extends downward from the head pipe 11. Also, the down frame 13 is formed divided into the left down frame portion 131 and the right down frame portion 132 along the entire region of the down frame 13. However, a configuration may be employed in which a single frame extends downward from the head pipe 11 or the main frame 12 and then branches into the left down frame portion 131 and the right down frame portion 132.

The left and right pair of seat frames 14 are provided extending rearward from the left frame portion 121 and the right frame portion 122 of the main frame 12 and support a seat 4, Also, a sub-frame 15 is provided, downward from the left and right pair of seat frames 14, for connecting the left frame portion 121 and the right frame portion 122 and the left and right pair of seat frames 14.

The head pipe 11 supports a steering mechanism 18 for steering a front wheel FW. The steering mechanism 18 includes a steering stem 181 is turnable supported on the head pipe 11, and a top bridge 182 is attached to an upper end portion of the steering mechanism 18 and a bottom bridge 183 is attached to a lower end portion of the steering mechanism 18. The top bridge 182 is provided with a handle 184 for a driver to steer the front wheel FW. A left and right pair of front forks 185 are supported by the top bridge 182 and the bottom bridge 183. The front forks 185 extend frontwardly downward with respect to the vehicle, and the front wheel is rotatably supported on lower ends thereof.

The rear swing arm 19, at a front end portion, is swingable supported by the pivot shaft 125 provided in the rear frame portions 124. At a rear end portion of the rear swing arm 19, a rear wheel RW is rotatably supported, and the rear wheel RW is rotationally driven by a chain 23 wound around a drive sprocket 323 of a motor unit 30 and a driven sprocket 22 of the rear wheel RW. The rear swing arm 19 includes, at an upper portion thereof, a support portion 191 that supports the rear suspension 21, and shake here is dampened by the rear suspension 21.

The motor unit 30 includes an electric motor 31 that outputs a driving force to rotate the drive sprocket 323. A battery 16 stores power that is supplied to the motor unit 30. A control unit 40 executes control (drive control) of the supply of power, with the battery 16 as a power source, to the motor unit 30, and in particular to the electric motor 31. The control unit 40 controls the power that is supplied to the motor unit 30 according to an acceleration operation or the like by the driver. The motor unit 30 and the control unit 40 generate heat when driven. However, a heat exchanger 24 and a circulating cooling medium cools the motor unit 30 and the control unit 40, helping to prevent the motor unit 30 and the control unit 40 reaching a high temperature.

Figure 3:
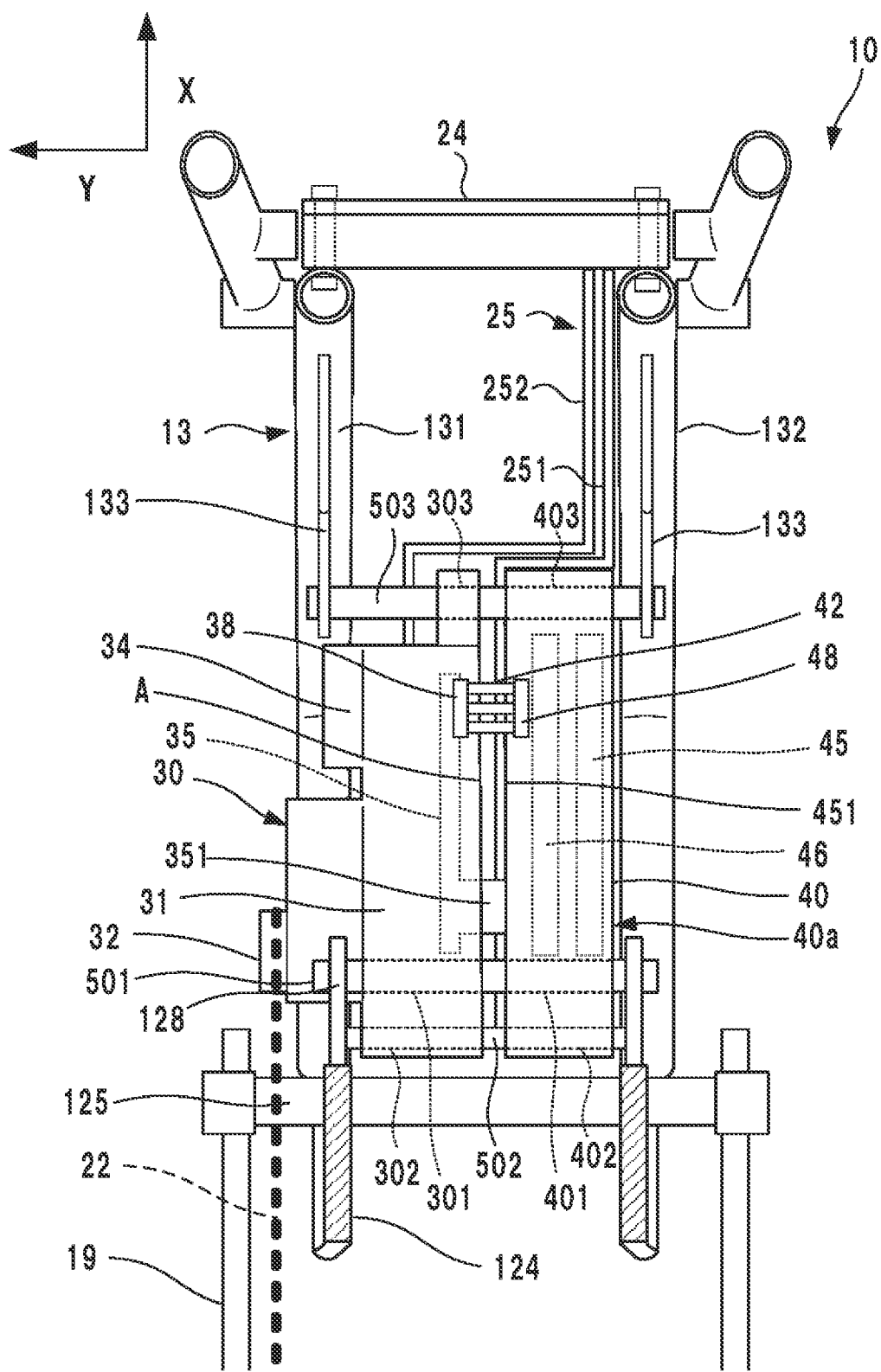
FIG. 3 is a cross-sectional view taken along line II-II of FIG. 1 illustrating the arrangement configuration of a motor unit and a control unit.

Arrangement Configuration of the Motor Unit and the Control Unit Next, FIGS. 1 to 3 will be referenced. FIG. 3 is a cross-sectional view taken along line II-II of FIG. 1 illustrating the arrangement configuration of the motor unit 30 and the control unit 40.

In the present embodiment, a housing portion 10a of the battery 16, the motor unit 30, and the control unit 40 is mainly defined by the main frames 12 and the down frames 13. In the present embodiment, the housing portion 10a on the left side in the vehicle width direction is defined by the head pipe 11, the left frame portion 121, and the left down frame portion 131 connected in a loop-like shape, and the housing portion 10a on the right side in the vehicle width direction is defined in a similar manner by the head pipe 11, the right frame portion 122, and the right down frame portion 132 connected in a loop-like shape. With this loop-shaped frame, the protection performance of the sides of the battery 16, the motor unit 30, and the control unit 40 can be increased. The lower limit of the housing portion 10a in the vertical direction is defined by the down frames 13, and on the upper side, with the vehicle body frame 10 being open, the housing portion 10a is defined by a cover member 17.

Also, inside the housing portion 10a, the battery 16, the motor unit 30, and the control unit 40 are housed. The battery 16 is disposed, as viewed in a top view of the vehicle, between the left frame portion 121 and the right frame portion 122 of the front frame portion 123, and is supported by the left frame portion 121 and the right frame portion 122 via a not illustrated fixing structure. Also, only the battery 16 is disposed projecting higher than the front frame portion 123 and covered by the cover member 17. Because the battery 16 projects higher than the front frame portion 123, a larger battery can be installed.

In the present embodiment, the following structure for the housing portion 10a is employed to create more housing space for the battery 16. In other words, in the present embodiment, the motor unit 30 and the control unit 40 are disposed side by side, overlapping one another in a vehicle side view. Thus, more battery housing space can be created in the front-and-rear direction and/or the vertical direction. In the configuration of the present embodiment, the motor unit 30 and the control unit 40 are disposed inside the housing portion 10a in space on the rear side. This can create more housing space for the battery 16 in space on the front side of the housing portion 10a. Also, the motor unit 30 and the control unit 40 are disposed inside the housing portion 10a in space on the lower side. This can create more housing space for the battery in space on the upper side of the housing portion 10a. Here, the battery 16 includes a surface 16a that faces a front side of the motor unit 30 and the control unit 40 and a surface 16b that faces an upper side of the motor unit 30 and the control unit 40. According to the configuration described above, the shape of the battery 16 can be determined with the surface 16a located further rearward and the surface 16b located further downward. As a result, the battery 16 with a larger capacity can be installed.

Also, in the present embodiment, the left down frame portion 131 and the right down frame portion 132 each include an attachment portion 133 for attachment of the motor unit 30 and the control unit 40. In the employed arrangement structure, the motor unit 30 and the control unit 40 are disposed side by side in the vehicle width direction, with the motor unit 30 being disposed to the front of the rear frame portion 124 and in a rear portion on the left side of the housing portion 10a and the control unit 40 being disposed in a rear portion on the right side of the housing portion 10a.

The motor unit 30 and the control unit 40 having the configurations described below are made thin in the vehicle width direction. This allows the motor unit 30 and the control unit 40 to be disposed inside the housing portion 10a side by side in the vehicle width direction. Also, in the present embodiment, the motor unit 30 and the control unit 40, both opposing surfaces of the motor unit 30 and the control unit 40 have a shape with minimal deviation in the Y direction with minimal ridges and grooves and/or steps. This allows the motor unit 30 and the control unit 40 to be disposed with little distance between the two, allowing the motor unit 30 and the control unit 40 to be disposed inside the housing portion 10a side by side in the vehicle width direction. Thus, the motor unit 30 and the control unit 40 both include a portion where the two overlap within the area in the vertical direction and the front-and-rear direction in which the motor unit 30 and the control unit 40 are disposed.

In particular, in the present embodiment, the entire motor unit 30 is disposed overlapping the control unit 40 in a vehicle side view. In this way, more housing space can be ensured for the battery 16 in the longitudinal direction and vertical direction of the vehicle. Note that other arrangements may be employed, including the entire control unit 40 overlapping the motor unit 30 or the control unit 40 and the motor unit 30 partially overlapping one another.

Also, in a top view of the vehicle, the motor unit 30 and the control unit 40 are disposed between the left frame portion 121 and the right frame portion 122 in the Y direction, or in other words, within a range of a maximum width W of the two. With such an arrangement, the configuration components of the motor unit 30, the control unit 40, and the like can be prevented from projecting outward in the vehicle width direction, allowing the configuration components to be disposed in a well-balanced manner on the left and right sides.

Also, in a top view of the vehicle, the motor unit 30 and the control unit 40 are disposed not overlapping one another. In the present embodiment, the motor unit 30 and the control unit 40 do not include a portion where the two overlap within the area in the vehicle width direction where the motor unit 30 and the control unit 40 are disposed and are disposed side by side in the vehicle width direction. The motor unit 30 is located on the left side, and the control unit 40 is located on the right side. As illustrated in FIG. 2, with such an arrangement, for example, the maximum width W of the left frame portion 121 and the right frame portion 122 in the Y direction is divided evenly into thirds, and the motor unit 30 is disposed with a surface A located opposing the control unit 40 within the central W/3 area. Also, for example, in the case in which the surface A opposing the control unit 40 is not constant in the Y direction, the motor unit 30 is disposed with the portion of the surface A closest to the control unit being located within the central W/3 area.

In the present embodiment, in a top view of the vehicle, the motor unit 30 and the control unit 40 are disposed not overlapping one another and disposed side by side in the vehicle width direction. Thus, traveling winds or the like may easily pass directly between the opposing surfaces from the front. Also, because the opposing surfaces of the motor unit 30 and the control unit 40 both have large surface areas and traveling winds or the like may easily come into direct contact with the surfaces, the motor unit 30 and the control unit 40 can be efficiently cooled.

Next, the attachment structure of the motor unit 30 and the control unit 40 will be further described. The motor unit 30 and the control unit 40 are supported by a left and right pair of upper attachment portions 128 and a left and right pair of lower attachment portions 129 formed on the rear frame portions 124 and the left and right pair of attachment portions 133 formed on the down frames 13. The motor unit 30 and the control unit 40 are supported at three sections on the highly rigid vehicle body frame 10, allowing the effect of vehicle body vibration and the like to be minimized or prevented.

Figure 4:
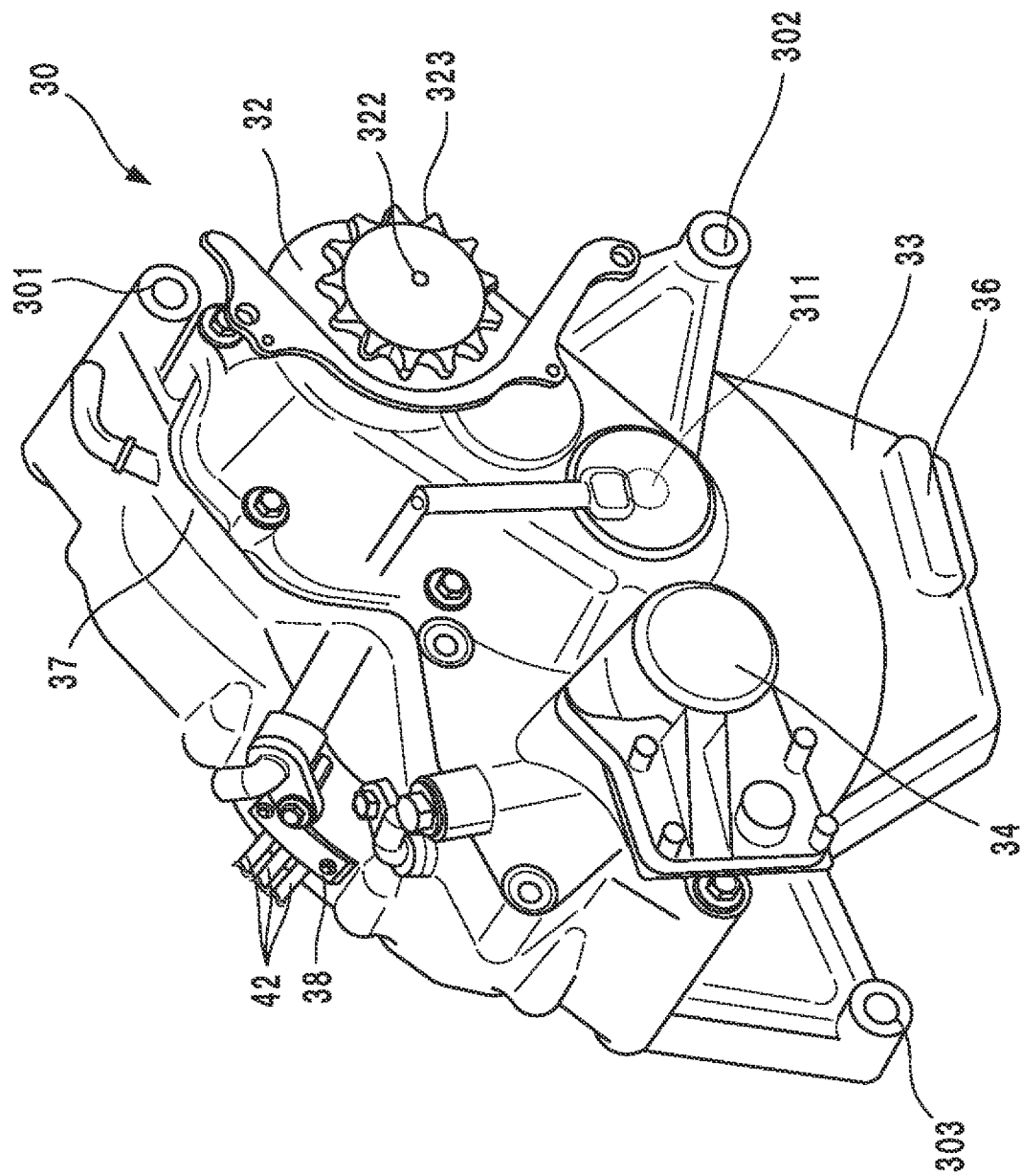
FIG. 4 is a perspective view of the motor unit according to the first embodiment.

Next, FIG. 4 as well as FIGS. 1 and 3 will be referenced. FIG. 4 is a perspective view of the motor unit 30. The motor unit 30 includes through-holes 301, 302, and 303 for attaching the motor unit 30 to the upper attachment portions 128, the lower attachment portions 129, and the attachment portions 133. The control unit 40 also includes through-holes 401, 402, and 403 which align with the through-holes 301, 302, and 303 in a vehicle side view when the units are assembled.

A fixing member 501 that spans between the left frame portion 121 and the right frame portion 122 in the vehicle width direction is able to be attached to the upper attachment portions 128. The fixing member 501 is attached to the upper attachment portions 128 extending through the through-holes 301 and 401 to fix the motor unit 30 and the control unit 40 to the rear frame portions 124.

Using a similar configuration, at the lower attachment portions 129, the motor unit 30 and the control unit 40 are fixed to the rear frame portions 124 via a fixing member 502, and at the attachment portions 133, the motor unit 30 and the control unit 40 are fixed to the down frames 13 via a fixing member 503.

In this way, the fixing member 503 extends through the motor unit 30 and the control unit 40 and fixes the motor unit 30 and the control unit 40 to the rear frame portions 124 and the down frames 13. This allows the number of parts for the fixing parts to be reduced and allows an offset in position between the motor unit 30 and the control unit 40 in the froth-and-rear direction and the vertical direction to be suppressed.

Also, in the present embodiment, the heat exchanger 24 is also fixed to the down frames 13. Thus, the heat exchanger 24, the motor unit 30, and the control unit 40 are all fixed to the down frames 13. Thus, the heat exchanger 24, the motor unit 30, and the control unit 40 can be fixed to the down frames 13 and formed as an integral body that can then be attached to the main frames 12. This can improve ease of assembly and maintainability.

A bus bar connection portion 38 is provided on an upper portion of the motor unit 30 and a bus bar connection portion 48 is provided on an upper portion of the control unit 40, and a bus bar 42 is connected to both. The control unit 40 supplies power to the motor unit 30 via the bus bar 42.

In the present embodiment, the motor unit 30 and the control unit 40 are fixed to the vehicle body frame 10 via the fixing members 501, 502, and 503 that extend through the motor unit 30 and the control unit 40 in the vehicle width direction. Thus, an offset in position between the motor unit 30 and the control unit 40 is suppressed. In this way, swing when the motor unit 30 and the control unit 40 are connected does not need to be considered, and the motor unit 30 and the control unit 40 can be fixed to one another by the bus bar 42. Also, because the motor unit 30 and the control unit 40 are disposed side by side, the bus bar 42 can be made short. This allows costs to be reduced and the chance of wire breakage to be reduced.

The control unit 40 includes a case member 40a with a box-like shape and, inside the case member 40a, a drive circuit board 45 for supplying power to the electric motor and a control circuit board 46 for transmitting a control signal to the drive circuit board 45. The drive circuit board 45 and the control circuit board 46 are disposed with the horizontal direction surfaces aligned with the front-and-rear direction and vertical direction and the normal line direction surfaces aligned with the vehicle width direction. Thus, the entire control unit 40 can be formed thin in the vehicle width direction. Also, the drive circuit board 45 and the control circuit board 46 are disposed side by side in the vehicle width direction, and, in the present embodiment, the drive circuit board 45 is disposed outward of the control circuit board 46 in the vehicle width direction. The drive circuit board 45 is more prone to temperature increase than the control circuit board 46, and so by disposing the drive circuit board 45 on the outer side, the drive circuit board 45 can be efficiently cooled by traveling winds.

Specific Configuration of the Motor Unit

Figure 5:
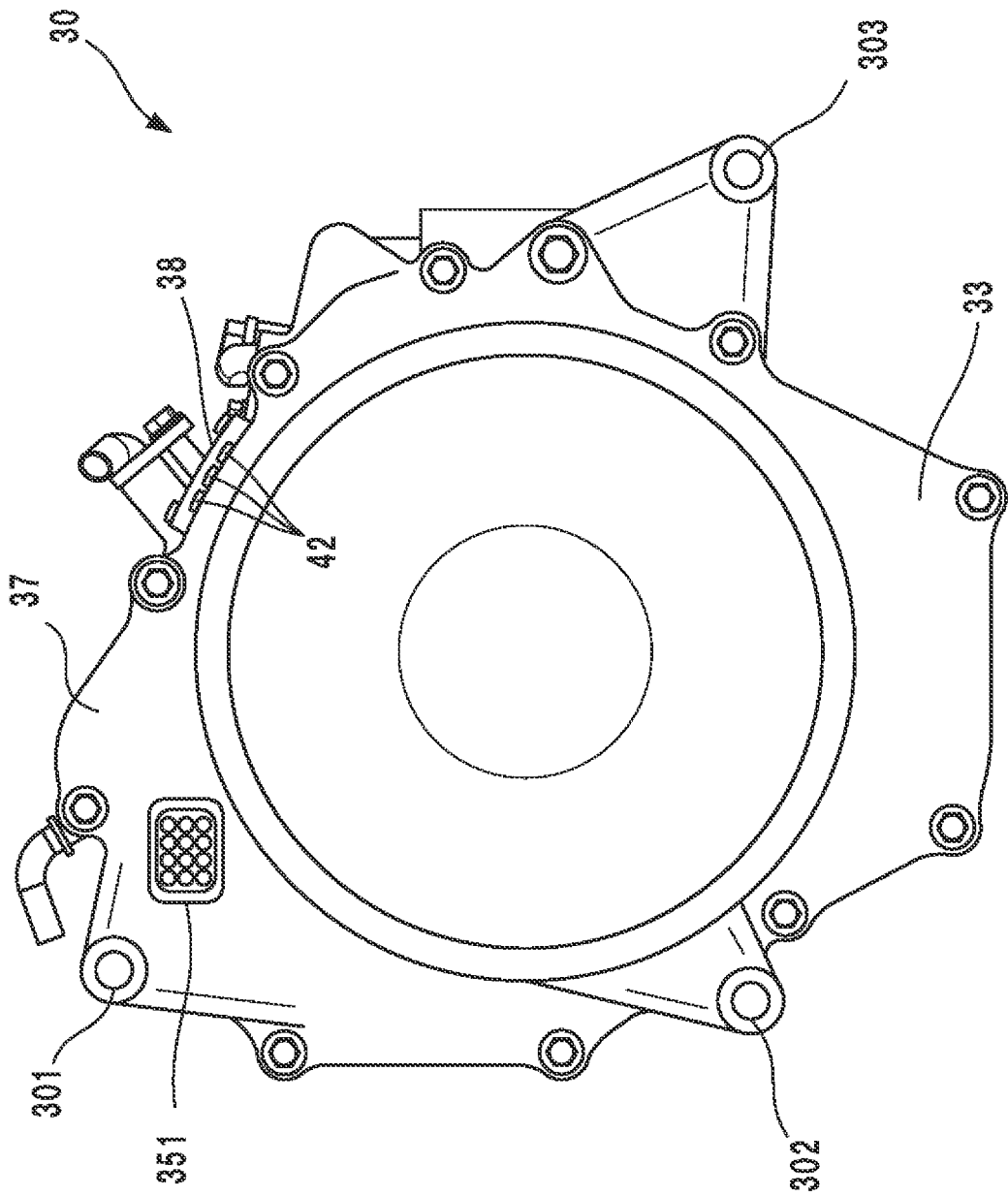
FIG. 5 is a diagram illustrating a surface of the motor unit of FIG. 4 that opposes the control unit.
Figure 5:
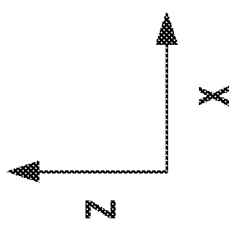

FIGS. 1, 4, and 5 will be referenced. FIG. 5 is a diagram illustrating the surface of the motor unit 30 that opposes the control unit 40. The motor unit 30 includes the electric motor 31 through which a motor shaft 311 extends in the vehicle width direction and a deceleration portion 32 for decelerating the rotation of the motor shaft 311 of the electric motor 31. In a vehicle side view, the electric motor 31 and the deceleration portion 32 are disposed overlapping one another.

The deceleration portion 32 includes a case portion 321, a reduction gear (not illustrated) for decelerating the rotation of the motor shaft 311, and an Output shaft 322 for outputting a driving force after deceleration via the reduction gear (not illustrated). In the present embodiment, the output shaft 322 is located rearward of the motor shaft 311 with respect to the vehicle. The drive sprocket 323 is attached to the output shaft 322 of the deceleration portion 32. The output shaft 322 is located frontward of the pivot shaft 125 and on an extension line of a straight line running through the center of the rear wheel and the pivot shaft.

An oil pan 33 is formed on a bottom portion of the motor unit 30. Oil collected in the oil pan 33 is taken in by an oil pump 34 and discharged to circulate the oil inside the motor unit 30 and a circulation path 25. The oil is used as a cooling medium to cool the motor unit and the control unit and to lubricate the inner portions of the motor unit 30. The oil supplied to the inner portions of the motor unit 30 is returned to the oil pan 33 via the oil dropping naturally.

The motor unit 30 includes, on an upper portion thereof, a breather chamber 37 for connecting the motor unit 30 to the outside and for gas-liquid separation. Also, the motor unit 30 includes an oil filter 36 that removes impurities in the oil circulating in the motor unit 30.

Inside the motor unit 30, a resolver 35 is provided that detects a rotation angle of the electric motor 31, and the surface opposing the control unit 40 is provided with a motor side connection terminal 351. The surface of the control unit 40 opposing the motor unit 30 is provided with a control unit side connection portion 451 at a position overlapping the motor side connection terminal 351 in a vehicle side view when the units are assembled. The motor side connection terminal 351 and the control unit side connection portion 451 engage with one another when the units are assembled.

The overall shape of the motor unit 30 differs depending on the positional relationship of the constituent elements. In the present embodiment, the electric motor 31 is disposed with the axial direction of the motor shaft 311, the length of which being short compared to the radial direction of the motor shaft 311, aligned with the vehicle width direction. Also, the deceleration portion 32 and the oil pump 34 project outward from the electric motor 31 in the vehicle width direction and are provided side by side in the front-and-rear direction. Because the deceleration portion 32 and the oil pump 34 project in the same direction from the electric motor 31 and are disposed side by side in the front-and-rear direction, the thickness of the motor unit 30 in the vehicle width direction can be reduced. Also, the oil pan 33 projects downward from the electric motor 31 and the breather chamber 37 projects upward from the electric motor 31. Thus, the thickness of the motor unit 30 in the vehicle width direction can be reduced. With this configuration, the entire motor unit 30 can be formed thin in the vehicle width direction. Also, the lower end of the oil pan 33 extends downward from the control unit 40, allowing the oil pan 33 to easily come into contact with traveling winds.

Furthermore, in the present embodiment, both the deceleration portion 32 and the oil pump 34 project outward from the electric motor 31 in the vehicle width direction. Thus, the surface of the motor unit 30 opposing the control unit 40 has a shape with minimal deviation in the Y direction with minimal ridges and grooves and/or steps. In this way, the motor unit 30 and the control unit 40 can be disposed with little distance between.

Cooling Circuit Configuration

The configuration of a cooling circuit of the present embodiment will be described with reference to FIGS. 1 and 2. The heat exchanger 4 according to the present embodiment is an oil cooler, and the cooling medium is an oil that also functions as a lubricant for the inner portion of the motor unit 30.

The cooling medium cooled at the heat exchanger 24 circulates to the oil pan 33 through the inside of a first tube shaped member 251. Here, the first tube shaped member 251 extends downward from the heat exchanger 24 along the down frame 13 and connects to the oil pan 33 after passing through the side of the control unit 40. The oil having been circulated through the inner portion of the motor unit 30 via the oil pump 34 is circulated to the heat exchanger 24 through the inner portion of a second tube shaped member 252. Here, the second tube shaped member 252 extends from the oil pan 33 along the down frame 13 and connects to the heat exchanger. In other words, the circulation path 25 includes the first tube shaped member 251, the motor unit inner portion, and the second tube shaped member 252. The oil, i.e., cooling medium, circulates through the circulation path 25 in order from the heat exchanger 24, the control unit 40, the motor unit 30, and the heat exchanger 24.

The control unit 40 is cooled before the motor unit 30 by this cooling path. Thus, the control unit 40 with less heat resistance than the motor unit 30 can be preferentially cooled. Also, because the heat exchanger 24, the control unit 40, and the motor unit 30 are disposed close to one another, the cooling path can be shortened.

Also, in the present embodiment, heat concentration due to the motor unit 30 and the control unit 40 being disposed close to one another can be alleviated by the heat exchanger 24. Furthermore, the heat exchanger 24 is also disposed close to the motor unit 30 and the control unit 40, allowing the circulation path 25 to be shortened.

Note that the heat exchanger 24 may be a radiator, in the case in which a radiator is employed, the oil pan 33 may be provided with a water jacket formed of holes capable of allowing cooling fluid through, the cooling fluid passing through the inner portion thereof. With this configuration, oil inside the motor unit 30 can be cooled.

Effect of Embodiment

As described above, according to the present embodiment, at least a portion of the control unit 40 overlaps the motor unit 30 in the vehicle width direction. This allows more arrangement space for the battery 16 to be ensured in the longitudinal direction and the vertical direction of the vehicle. Thus, the battery capacity can be increased. Also, the wiring between the motor unit 30 and the control unit 40 can be shortened, allowing costs to be reduced and the chance of wire breakage to be reduced.

Also, the motor and the control unit 40 are disposed between the main frames 12. This allows projections outward in the vehicle width direction to be suppressed. In this way, the configuration components can be disposed in a well-balanced manner on the left and right sides.

Second Embodiment

Figure 6:
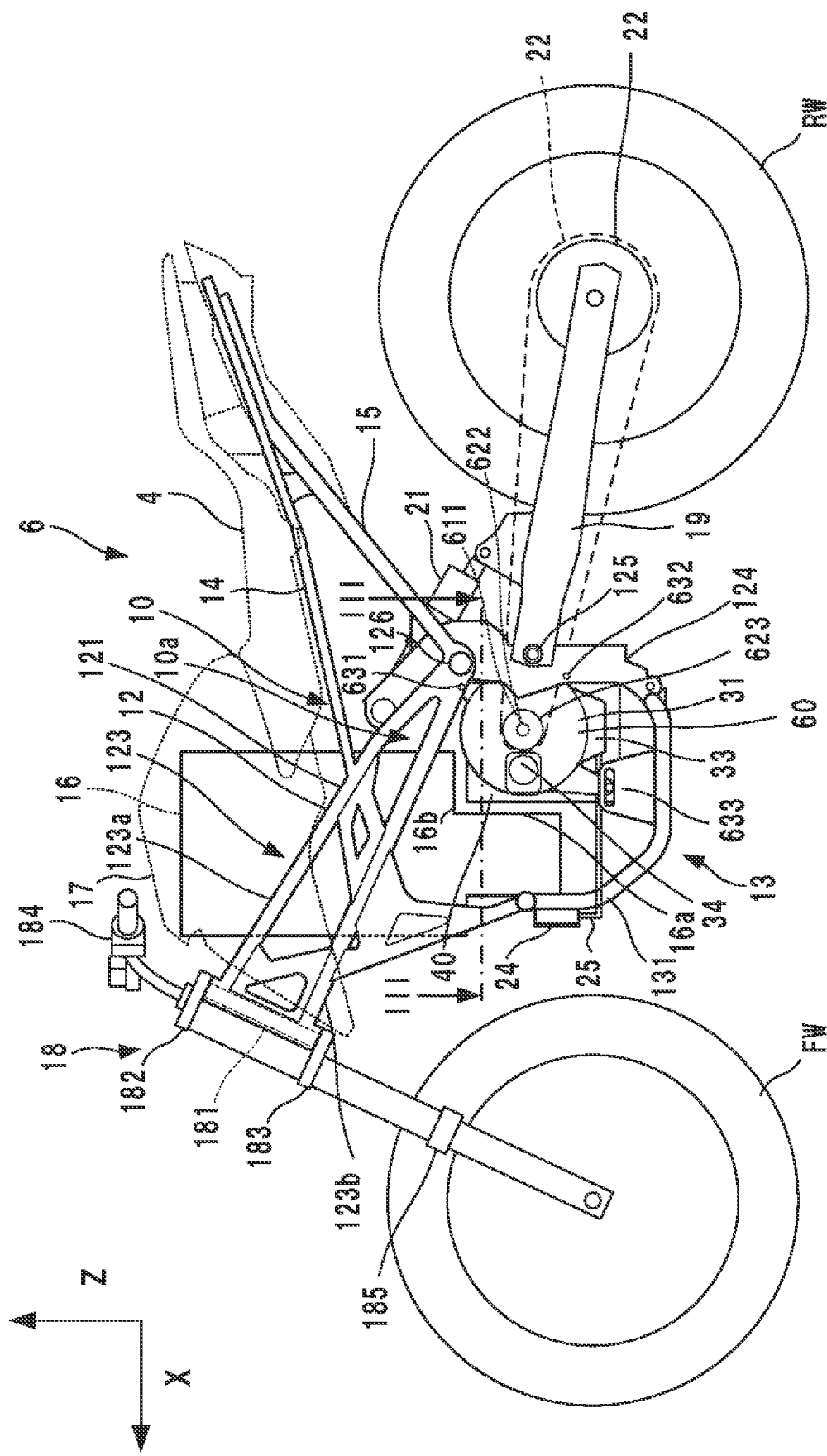
FIG. 6 is a left side view of a straddle type electric vehicle according to a second embodiment.

FIG. 6 is a side view of a straddle type electric vehicle 6 according to a second embodiment. Hereinafter, components similar to those of the first embodiment will be given the same reference sign and description thereof will be omitted. The second embodiment is different from the first embodiment in terms of the motor unit 30. In a motor unit 60 according to the second embodiment, a motor shaft 611 of an electric motor 61 and an output shaft 622 are coaxially disposed. By disposing the motor shaft 611 and the output shaft 622 coaxially, a deceleration mechanism in which a deceleration portion (not illustrated) includes a planetary gear, for example, can be employed. The motor unit 60 and the control unit 40 are supported at three points, an upper attachment portion 631 on the front frame portion 123, a lower attachment portion 632 on the rear frame portion 124, and an attachment portion 633 on the down frame 13.

The motor shaft 611 and the output shaft 622 are coaxially disposed and the position of the output shaft 622 is the same position as in the first embodiment in a vehicle side view. Thus, the motor unit 60 overall is disposed more to the rear compared to the motor unit 30 according to the first embodiment. In the present embodiment, because the motor unit 60 is disposed more to the rear, a portion of the unit is disposed overlapping the rear frame portion 124 in a vehicle side view. Also, the control unit 40 is disposed overlapping the motor unit 60 in a vehicle side view as in the first embodiment. In the present embodiment, as the motor unit 60 is disposed more to the rear, the portion of the control unit 40 that overlaps the rear frame portion 124 is disposed more to the rear. This can create more housing space for the battery 16 in space on the front side of the housing portion 10a. In this way, more housing space for the battery 16 can be ensured, and the shape of the battery 16 can be one in which the surface 16a opposing the unit 60 and the unit 40 to the front is located more to the rear. This allows for the battery 16 with larger capacity to be installed.

Summary of Embodiments

The embodiments described above disclose at least the following vehicle.

1. A straddle type electric vehicle (for example, 1) of the embodiment described above includes:
a front wheel (for example, FW) and a rear wheel (for example, RW);
a vehicle body frame (for example, 10) that supports a steering mechanism (for example, 18) for steering the front wheel;
a motor unit (for example, 30) including an electric motor (for example, 31) that outputs a driving force to rotate the rear wheel;
a battery (for example, 16) that supplies power to the motor unit; and
a control unit (for example, 40) that executes drive control of the motor unit, wherein
the vehicle body frame includes a main frame (for example, 12) extending in a vehicle longitudinal direction;
the motor unit, the battery, and the control unit are supported by the main frame between the front wheel and the rear wheel; and
in a vehicle side view, the motor unit and the control unit are disposed overlapping one another.

According to this embodiment, at least a portion of the control unit overlaps the motor unit in the vehicle width direction. This allows more arrangement space for the battery to be ensured in the longitudinal direction and the vertical direction of the vehicle. In this way, a straddle type electric vehicle in which more housing space for a battery can be ensured is provided.

2. In the straddle type electric vehicle of the embodiment described above, the main frame includes a left frame portion (for example, 121) extending in the vehicle longitudinal direction and a right frame portion (for example, 122) extending in the vehicle longitudinal direction; and
in a vehicle top view, the motor unit and the control unit are disposed between the left frame portion and the right frame portion.

According to this embodiment, the motor unit and the control unit are disposed between the main frames. This allows projections outward in the vehicle width direction to be suppressed. In this way, the configuration components can be disposed in a well-balanced manner on the left and right sides.

3. In the straddle type electric vehicle of the embodiment described above, an upper portion of the motor unit and an upper portion of the control unit are connected via a bus bar (for example, 42).

According to this embodiment, by disposing the control unit to the side of the motor unit, the need to consider swing is reduced and the control unit and the motor unit can be fixed via the bus bar.

4. The straddle type electric vehicle of the embodiment described above further includes
a heat exchanger (for example, 24) disposed frontward of the motor unit and the control unit in the vehicle longitudinal direction; and
a circulation path (for example, 25) for circulating a cooling medium, wherein the circulation path is formed to circulate the cooling medium in order from the heat exchanger, the control unit, the motor unit, and the heat exchanger.

According to this embodiment, heat concentration due to the motor unit and the control unit being disposed close to one another can be alleviated by the heat exchanger. Furthermore, the heat exchanger is also disposed close to the motor unit and the control unit, allowing the circulation path to be shortened.

5. In the straddle type electric vehicle of the embodiment described above, the motor unit includes a resolver (for example, 35) and a connection terminal (for example, 351) for connecting the resolver to the control unit, and
the connection terminal is disposed orientated toward the control unit.

According to this embodiment, by disposing the terminal of the resolver orientated toward the control unit, the control unit can be easily connected to, reducing the amount of wiring.

6. In the straddle type electric vehicle of the embodiment described above, the vehicle body frame further includes a down frame (for example, 13) extending in the vehicle longitudinal direction downward from the main frame,
a rear end portion of the main frame and a rear end portion of the down frame are connected, and
the heat exchanger, the motor unit, and the control unit are fixed to the down frame.

According to this embodiment, the motor unit, the control unit, and the heat exchanger are all fixed to the down frame, forming an integral body that can be attached to the main frame. This improves ease of assembly and maintainability.

In the straddle type electric vehicle of the embodiment described above, the down frame includes a left down frame portion (for example, 131) and a right down frame portion (for example, 132),
the motor unit and the control unit each include a through-hole (for example, 303 and 403) extending therethrough in the vehicle width direction,
a fixing member (for example, 503) is provided that extends through the through-holes and spans between the motor unit and the control unit in the vehicle width direction, and
the motor unit and the control unit are fixed to the left down frame portion and the right down frame portion via the fixing member.

According to this embodiment, the motor unit and the control unit are fixed via the fixing members extending therethrough in the Vehicle width direction. In this way, the same fixing member to be used for both units. Thus, the number of parts for the fixing members can be reduced, and an offset in position between the motor unit and the control unit can be suppressed.

8. In the straddle type electric vehicle of the embodiment described above, the motor unit further includes a deceleration portion (for example, 32), and in a vehicle side view, the electric motor, the deceleration portion, and the control unit are disposed overlapping one another.

According to this embodiment, the deceleration portion also can be contained on the inner side of the vehicle body frame in the vehicle width direction. This facilitates protection of the motor unit from external disturbances such as impacts upon falling or collision.

9. In the straddle type electric vehicle of the embodiment described above, the control unit includes a drive circuit board (for example, 45) for supplying power to the electric motor and a control circuit board (for example, 46) that transmits a control signal to the drive circuit board,
the drive circuit board and the control circuit board are disposed side by side in the vehicle width direction, and
the drive circuit board is disposed outward of the control circuit board in the vehicle width direction.

According to this embodiment, the drive control board, which is more prone to heating up than the control circuit board, is disposed on the outer side in the vehicle width direction. This facilitates cooling via traveling winds.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A straddle type electric vehicle comprising:
a front wheel and a rear wheel;
a vehicle body frame that supports a steering mechanism for steering the front wheel;
a motor unit including an electric motor that outputs a driving force to rotate the rear wheel;
a battery that supplies power to the motor unit; and
a control unit that executes drive control of the motor unit,
wherein the vehicle body frame includes a main frame extending in a vehicle longitudinal direction;
the motor unit, the battery, and the control unit are supported by the main frame between the front wheel and the rear wheel;
in a vehicle side view, the motor unit and the control unit are disposed overlapping one another; and
the motor unit and the control unit are disposed in a vehicle width direction so that traveling winds pass between the motor unit and the control unit.

2. The straddle type electric vehicle according to claim 1, wherein the main frame includes a left frame portion extending in the vehicle longitudinal direction and a right frame portion extending in the vehicle longitudinal direction; and
in a vehicle top view, the motor unit and the control unit are disposed between the left frame portion and the right frame portion.

3. The straddle type electric vehicle according to claim 1, wherein an upper portion of the motor unit and an upper portion of the control unit are connected via a bus bar.

4. The straddle type electric vehicle according to claim 1, further comprising:
a heat exchanger disposed frontward of the motor unit and the control unit in the vehicle longitudinal direction; and
a circulation path for circulating a cooling medium,
wherein the circulation path is formed to circulate the cooling medium in order from the heat exchanger, the control unit, the motor unit, and the heat exchanger.

5. The straddle type electric vehicle according to claim 1, wherein the motor unit includes a resolver and a connection terminal for connecting the resolver to the control unit, and
the connection terminal is disposed orientated toward the control unit.

6. The straddle type electric vehicle according to claim 4,
wherein the vehicle body frame further includes a down frame extending in the vehicle longitudinal direction downward from the main frame,
a rear end portion of the main frame and a rear end portion of the down frame are connected, and
the heat exchanger, the motor unit, and the control unit are fixed to the down frame.

7. The straddle type electric vehicle according to claim 6,
wherein the down frame includes a left down frame portion and a right down frame portion,
the motor unit and the control unit each include a through-hole extending therethrough in the vehicle width direction,
a fixing member is provided that extends through the through-holes and spans between the motor unit and the control unit in the vehicle width direction, and
the motor unit and the control unit are fixed to the left down frame portion and the right down frame portion via the fixing member.

8. The straddle type electric vehicle according to claim 1,
wherein the motor unit further includes a deceleration portion, and
in a vehicle side view, the electric motor, the deceleration portion, and the control unit are disposed overlapping one another.

9. The straddle type electric vehicle according to claim 1,
wherein the control unit includes a drive circuit board for supplying power to the electric motor and a control circuit board that transmits a control signal to the drive circuit board,
the drive circuit board and the control circuit board are disposed side by side in the vehicle width direction, and
the drive circuit board is disposed outward of the control circuit board in the vehicle width direction.

* * * * *